United States Patent
Lee et al.

(10) Patent No.: US 12,175,819 B2
(45) Date of Patent: Dec. 24, 2024

(54) DEVICE AND METHOD FOR USER AUTHENTICATION USING SECURITY CARD

(71) Applicant: ANDOPEN CO., LTD., Seongnam-si (KR)

(72) Inventors: Jun Gu Lee, Yongin-si (KR); Dong Hyun Oh, Yongin-si (KR)

(73) Assignee: ANDOPEN CO., LTD., Seongnam-si (KR)

( * ) Notice: Subject to any disclaimer, the term of this patent is extended or adjusted under 35 U.S.C. 154(b) by 178 days.

(21) Appl. No.: 17/436,324

(22) PCT Filed: Jun. 18, 2020

(86) PCT No.: PCT/KR2020/007933
§ 371 (c)(1),
(2) Date: Sep. 3, 2021

(87) PCT Pub. No.: WO2021/060670
PCT Pub. Date: Apr. 1, 2021

(65) Prior Publication Data
US 2022/0172537 A1    Jun. 2, 2022

(30) Foreign Application Priority Data

Sep. 26, 2019   (KR) .................. 10-2019-0118786
Apr. 7, 2020    (KR) .................. 10-2020-0042142

(51) Int. Cl.
*G07C 9/26* (2020.01)
*G06F 21/32* (2013.01)
(Continued)

(52) U.S. Cl.
CPC ............... *G07C 9/26* (2020.01); *G06F 21/32* (2013.01); *G06F 21/34* (2013.01); *G06V 40/16* (2022.01);
(Continued)

(58) Field of Classification Search
CPC .. G07C 9/26; G07C 9/29; G06F 21/32; G06F 21/34; G06F 2221/2133; G06V 40/10;
(Continued)

(56) References Cited

U.S. PATENT DOCUMENTS 10,943,138 B2 *  3/2021  Ackerman ........... G06V 40/172
2011/0164792 A1 *  7/2011  Yoon .................... G06V 20/653
                                                                    382/118
(Continued)

FOREIGN PATENT DOCUMENTS

CN    106778607 A    5/2017
CN    208225154 U    12/2018
(Continued)

OTHER PUBLICATIONS

Andrzej et al., "Aliveness Detection for IRIS Biometrics", IEEE, 2006, pp. 122-129, cited in EP Extended European Search Report dated May 13, 2022. (8 pages).

(Continued)

*Primary Examiner* — D'Arcy Winston Straub
(74) *Attorney, Agent, or Firm* — WHDA, LLP

(57) ABSTRACT

Disclosed are a device and a method for user authentication using a security card. The device for user authentication comprises: a card reader which, when a card is recognized, acquires a face image stored in the card; an infrared light source which emits infrared rays toward a user; an infrared camera which acquires an infrared image including the facial region of the user; a color camera which acquires a color image including the facial region of the user; and a control unit which determines a result of user authentication on the basis of at least one of the infrared image, the color image, and the face image, and generates a control signal according to the result of user authentication. The control unit performs a liveness test on the basis of the infrared (Continued)

image, and when it is determined that the result of the liveness test is successful, determines a result of face authentication on the basis of information about the facial region shown in at least one of the color image and the infrared image and on the basis of the face image acquired from the card.

13 Claims, 4 Drawing Sheets

(51) Int. Cl.
*G06F 21/34* (2013.01)
*G06V 40/16* (2022.01)
*G06V 40/18* (2022.01)
*G06V 40/40* (2022.01)
*G07C 9/29* (2020.01)
*H04L 9/40* (2022.01)

(52) U.S. Cl.
CPC .......... *G06V 40/166* (2022.01); *G06V 40/193* (2022.01); *G06V 40/45* (2022.01); *G07C 9/29* (2020.01); *H04L 63/0853* (2013.01); *H04L 63/0861* (2013.01); *G06F 2221/2133* (2013.01)

(58) Field of Classification Search
CPC ...... G06V 40/16; G06V 40/166; G06V 40/18; G06V 40/193; G06V 40/40; G06V 40/45; H04L 63/08; H04L 63/0853; H04L 63/0861
See application file for complete search history.

(56) References Cited

U.S. PATENT DOCUMENTS

2017/0244684 A1* 8/2017 Smith ............. G06F 21/62
2018/0025244 A1 1/2018 Bohl et al.
2019/0228248 A1* 7/2019 Han ............. G06F 18/211
2019/0251380 A1 8/2019 Park et al.

FOREIGN PATENT DOCUMENTS

| CN | 109816838 A | 5/2019 |
|---|---|---|
| JP | 2003-296800 A | 10/2003 |
| JP | 2005-216057 A | 8/2005 |
| JP | 2005-301861 A | 10/2005 |
| JP | 2007-004612 A | 1/2007 |
| JP | 2008-158597 A | 7/2008 |
| JP | 2008-305332 A | 12/2008 |
| JP | 2009009231 A | 1/2009 |
| JP | 2017-55250 A | 3/2017 |
| JP | 2019-28516 A | 2/2019 |
| KR | 2017-0056193 A | 5/2017 |
| KR | 2017-0123950 A | 11/2017 |
| KR | 2019-0089387 A | 7/2019 |
| WO | 2009/107237 A1 | 9/2009 |

OTHER PUBLICATIONS

Nedjah et al., "Efficient fingerprint matching on smart cards for high security and privacy in smart systems", Information Sciences, 2019, vol. 479, pp. 622-639, cited in EP Extended European Search Report dated May 13, 2022. (18 pages).

International Search Report dated Dec. 1, 2020, issued in counterpart application No. PCT/KR2020/007933, w/ English translation (6 pages).

Written Opinion dated Dec. 1, 2020, issued in counterpart application No. PCT/KR2020/007933 (4 pages).

* cited by examiner

DEVICE AND METHOD FOR USER AUTHENTICATION USING SECURITY CARD

TECHNICAL FIELD

Example embodiments relate to a user authentication device and method using a security card.

BACKGROUND ART

In general, entrances and exits of buildings including critical facilities that require security are equipped with a user authentication system that verifies identities of visitors or users and controls access of the visitors or users based on their right of access. This user authentication system may generally use an access card as a means of verifying the right of access of a user. In addition, an access control system that uses biometric authentication has been developed to strengthen security.

However, when using the access card, there are concerns that the access card may be lost, the access card may not be returned, or a third party without the right of access to a facility may steal the access card or find the access card to enter the facility. In addition, the access control system that uses bio-information including, for example, a face, a fingerprint, an iris, and the like, may have a false rejection rate and a false acceptance rate that increase as the number of users increases, and need a great cost for actual implementation, although the access control system may overcome the foregoing disadvantages of using the access card. In addition, storing and managing unique bio-information of users may need a great cost, and there is still a concern about the hacking of bio-information.

Thus, there is a desire for research and development of a user authentication technology that may effectively resolve the foregoing issues.

DISCLOSURE OF THE INVENTION

Technical Solutions

According to an aspect, there is provided a user authentication device including a card reader configured to obtain a face image stored in a card when the card is recognized, an infrared light source configured to emit infrared light toward a user, an infrared camera configured to obtain an infrared image including a facial region of the user, a color camera configured to obtain a color image including the facial region of the user, and a controller configured to determine a result of user authentication based on at least one of the infrared image, the color image, and the face image, and generate a control signal based on the result of the user authentication. The controller may perform a liveness test based on the infrared image. When a result of the liveness test is determined to be successful, the controller may determine a result of face authentication based on information about the facial region in at least one of the color image and the infrared image and on the face image obtained from the card.

The controller may perform the liveness test based on the infrared image. When the result of the liveness test is determined to be successful, the controller may determine the result of the face authentication based on the information about the facial region in at least one of the color image and the infrared image and on the face image obtained from the card.

When the result of the user authentication is determined, the controller may perform a control operation to delete, from a storage, the obtained infrared image, the obtained color image, and the obtained face image.

The controller may verify whether a reflection point shown when the infrared light is reflected by a pupil of the user is present in the infrared image. When the reflection point is verified not to be present in the infrared image, the controller may determine the result of the user authentication to be unsuccessful.

When the reflection point of the pupil is verified to be present in the infrared image, the controller may perform the face authentication based on at least one of the color image and the infrared image and on the face image stored in the card.

The controller may detect whether the facial region of the user is present in the infrared image. When the facial region is not detected in the infrared image, the controller may determine the result of the user authentication to be unsuccessful.

The controller may verify whether at least one of transmission and saturation of the infrared light occurs in the infrared image. When the at least one of the transmission and the saturation is verified to occur, the controller may determine the result of the user authentication to be unsuccessful.

The card may be a security card including an encoded face image. When the result of the liveness test is determined to be successful, the controller may extract a first facial feature from the encoded face image obtained through the card reader, extract a second facial feature from at least one of the color image and the infrared image, and determine the result of the face authentication based on a result of comparing the first facial feature and the second facial feature.

According to another aspect, there is provided a user authentication method including obtaining a face image stored in a card through a card reader, emitting infrared light toward a user, obtaining an infrared image including a facial region of the user and obtaining a color image including the facial region of the user, and determining a result of user authentication based on at least one of the infrared image, the color image, and the face image. The determining of the result of the user authentication may include performing a liveness test based on the infrared image, and determining a result of face authentication based on information about the facial region in at least one of the color image and the infrared image and on the face image obtained from the card, when a result of the liveness test is determined to be successful.

When the result of the user authentication is determined, the user authentication method may further include deleting the obtained infrared image, the obtained color image, and the obtained face image from a storage.

The determining of the result of the user authentication may include verifying whether a reflection point shown when the infrared light is reflected by a pupil of the user is present in the infrared image, and determining the result of the user authentication to be unsuccessful when the reflection point is verified not to be present in the infrared image.

When the reflection point of the pupil is verified to be present in the infrared image, the determining of the result of the user authentication may include performing the face authentication based on the face image stored in the card and at least one of the color image and the infrared image.

The determining of the result of the user authentication may include detecting whether the facial region of the user is present in the infrared image, and determining the result of the user authentication to be unsuccessful when the facial region is not detected in the infrared image.

The determining of the result of the user authentication may include verifying whether at least one of transmission and saturation of the infrared light occurs in the infrared image, and determining the result of the user authentication to be unsuccessful when the at least one of the transmission and the saturation is verified to occur.

The card may be a security card including an encoded face image. When the result of the liveness test is determined to be successful, the determining of the result of the user authentication may include extracting a first facial feature from the encoded face image obtained through the card reader, extracting a second facial feature from at least one of the color image and the infrared image, and determining the result of the face authentication based on a result of comparing the first facial feature and the second facial feature.

BEST MODE FOR CARRYING OUT THE INVENTION

Figure 1:
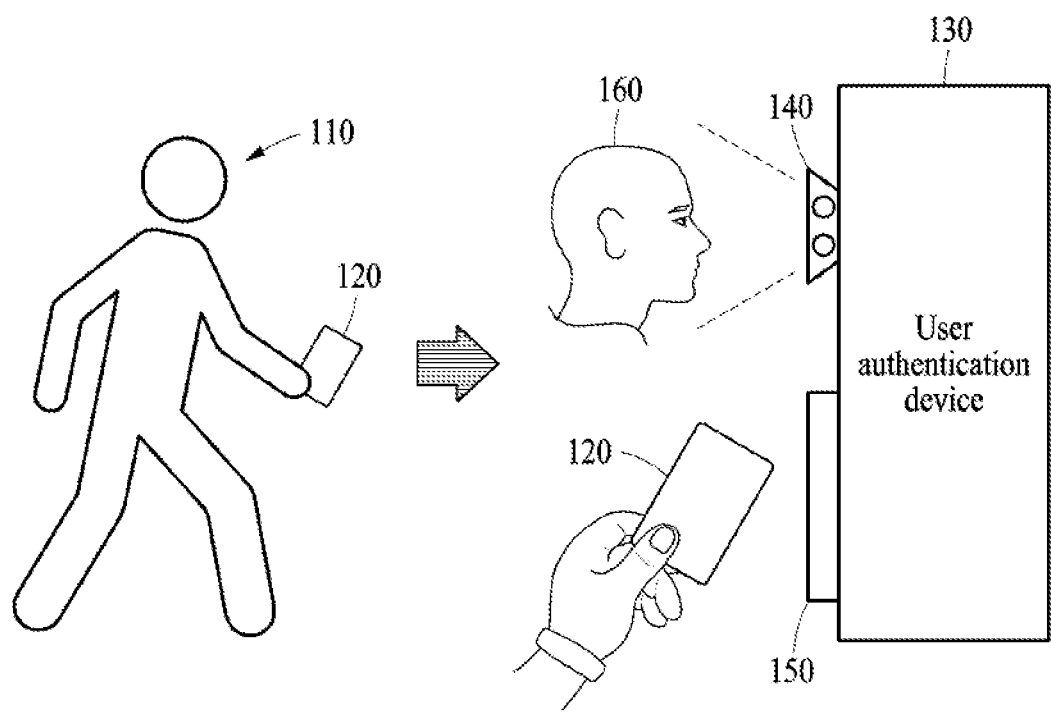
FIG. 1 is a diagram illustrating an example of a user authentication system using a security card according to an example embodiment.

Hereinafter, examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. Although terms such as "first," "second," and "third" may be used herein to describe various members, components, regions, layers, or sections, these members, components, regions, layers, or sections are not to be limited by these terms.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 is a diagram illustrating an example of a user authentication system using a security card according to an example embodiment.

Referring to FIG. 1, a user 110 may attempt at user authentication through a user authentication device 130. The user 110 described herein may be a person who tries to do user authentication in the user authentication device 130 and may also be referred to herein as an authentication target. The user 110 may allow a card to be recognized by the user authentication device 130 for the user authentication. When the card is recognized, the user authentication device 130 may perform the user authentication. The user authentication may include performing a liveness test for determining whether a test target is a live and genuine object or a fake object such as a sheet of paper, a photo image, a digital device, a replica, or the like, and performing face authentication for determining an authentication result based on a face image.

According to an example embodiment, the user authentication may include determining validity of the card. When the card is recognized, the user authentication device 130 may receive card information (e.g., card identification information, etc.) from the card, and determine whether the card is a valid card based on the received card information. When the card is determined to be a valid card, the user authentication device 130 may continue performing the user authentication including the liveness test and the face authentication. However, when the card is determined not to be a valid card, the user authentication device 130 may suspend the user authentication and block access by the user 110.

The card described herein may be a security card 120 including a face image. For example, the security card 120 may be a biometric identity (ID) card in which the face image is stored in a compressed or encoded form. The security card 120 stores therein the face image, and thus a previously issued security card may be compatibly used even when a face authentication algorithm is changed in another system.

According to example embodiments, the security card 120 may further include encoded and stored information including a name, an email address, a unique identification sign, a personal key, a public key, an authentication certificate, personal data, and the like. The user 110 may attempt at the user authentication in the user authentication device 130 using the security device 120, and the user authentication device 130 may perform the user authentication using the encoded face image obtained from the security card 120 and a face image obtained by capturing an image of a face 160 of the user 110. The user authentication device 130 may obtain a color image and an infrared image of the face 160 of the user 110 through an image acquirer 140. The user authentication device 130 may perform the liveness test on the user 110 using the color image and/or the infrared image, and perform the face authentication based on the face image obtained from the security card 120 and the color image and/or the infrared image.

When the user 110 tags the security card 120 to a card reader 150 of the user authentication device 130, bio-information (e.g., the face image) stored in the security card 120 may be transmitted to the user authentication device 130 through the card reader 150. The card reader 150 may include a communicator (not shown) configured to perform a short-range wireless communication function. The user authentication device 130 may obtain the face image of the face 160 of the user 110 through the image acquirer 140, and perform the face authentication by comparing the face image obtained from the security card 120 and the face image in the color image and/or the infrared image while performing an image analysis in real time.

It may not be easy to determine whether the user 110 possessing the security card 120 has an actual valid right using only the security card 120. However, the user authentication device 130 may obtain a face image by capturing an image of the face 160 of the user 110 through a camera, and perform the face authentication based on the obtained face image and the face image obtained from the security card 120, thereby complementing such a disadvantage of using the security card 120 and improving accuracy and security in the user authentication. In addition, when a result of the user authentication is derived, the user authentication device 130 may delete data used for the user authentication, for example, the face image obtained from the security card 120, the color image and the infrared image obtained through the image acquirer 140, and the like, thereby preventing in advance issues that may arise due to a leak of bio-information. In addition, the user authentication device 130 may perform the liveness test in addition to simply performing the face authentication, thereby effectively preventing a spoofing attack made using a replica, a photo image, or a display device and improving accuracy in the user authentication.

Thus, by the user authentication device 130 and the user authentication method described herein, it is possible to effectively overcome the disadvantages of an existing method using only a security card and an existing method using only biometric recognition, and implement a highly accurate user authentication technology.

Hereinafter, the user authentication device 130 and the user authentication method performed by the user authentication device 130 will be described in further detail.

Figure 2:
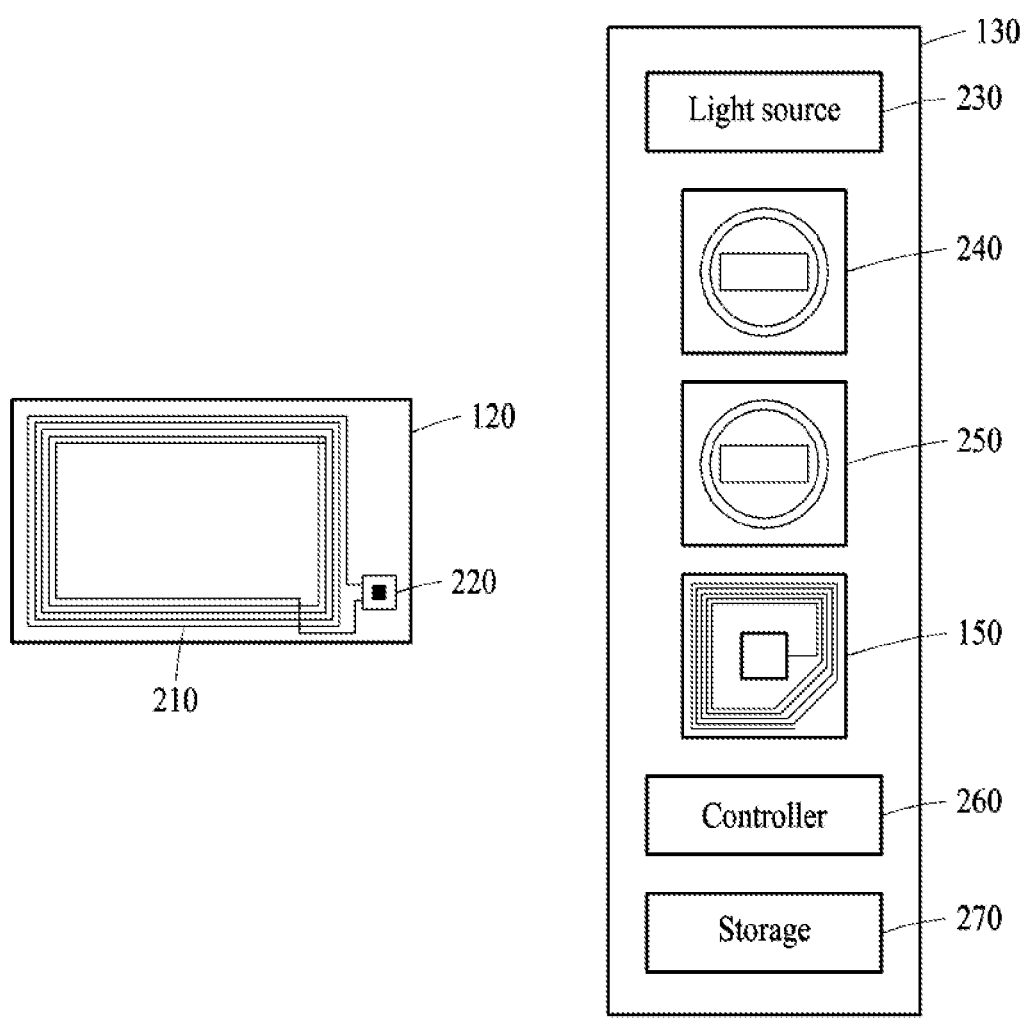
FIG. 2 is a diagram illustrating an example of a configuration of a user authentication system including a security card and a user authentication device according to an example embodiment.

FIG. 2 is a diagram illustrating an example of a configuration of a user authentication system including a security card and a user authentication device according to an example embodiment.

Referring to FIG. 2, a user authentication system may include a security card 120 and a user authentication device 130. The security card 120 may include a face image of a user of the security card 120. According to example embodiments, the security card 120 may further include personal information of the user or information about a unique identification sign.

According to an example embodiment, the security card 120 may be a card of a smart card type capable of performing short-range communication using a frequency of 13.56 megahertz (MHz). The security card 120 may be used as a tool for user authentication that transmits, to the user authentication device 130, information encoded and stored when a user authentication event occurs. The security card 120 may include a microchip 220, an antenna 210 connected to the microchip 220, and a storage (not shown) configured to store therein the face image and other related information. The antenna 210 may be included in a communicator (not shown), and the communicator may communicate with an external device having a short-range wireless communication function. The security card 120 may store therein data in an encoded form. The data stored in the storage of the security card 120 may be transmitted to an outside of the security card 120 through the antenna 210.

The form of the security card 120 may not be limited to the example illustrated or described above, but be provided in various forms or shapes. For example, any forms or shape that may include an antenna configured to perform short-range communication and a chip configured to store certain data may be used.

According to an example embodiment, the user authentication device 130 may include a light source 230, a color camera 240, an infrared camera 250, a card reader 150, a controller 260, and a storage 270.

The user authentication event may occur by the user authentication device 130 when the security card 120 is tagged to the card reader 150, the color camera 240 or the infrared camera 250 detects a facial region, or an approach of an object to the user authentication device 130 is sensed by a proximity sensor. When the user authentication event occurs, a series of operations for user authentication including a liveness test and/or face authentication may be performed.

According to an example embodiment, the light source 230 may include an infrared light source configured to emit infrared light toward the user. The infrared camera 250 may obtain an infrared image including a facial region of the user. The color camera 240 may obtain a color image including the facial region of the user. When the card such as the security card 120 is recognized, the card reader 150 may obtain the face image stored in the security card 120. The obtained face image and the obtained infrared image and/or color image may be temporarily stored in the storage 270.

The controller 260 may control an overall operation of the user authentication device 130. The controller 260 may control each component of the user authentication device 130 and transmit and receive processed data, and execute an operation corresponding to a result of the user authentication that is successful or unsuccessful based on an access right of the user.

For example, the controller 260 may determine a result of the user authentication based on at least one of the face image obtained from the security card 120, the infrared image, and the color image, and generate a control signal based on the determined result of the user authentication. The controller 260 may perform the liveness test on the user based on the obtained infrared image. When the user is determined to be a genuine object as a result of performing the liveness test, the controller 260 may determine the result of the liveness test to be successful. In this case, the controller 260 may perform the face authentication and determine a result of the face authentication. In contrast, when the user is determined to be a fake object as the result of performing the liveness test, the controller 260 may determine the result of the liveness test to be unsuccessful. In this case, the controller 260 may determine a final result of the user authentication to be unsuccessful, and block an access of the user and restrict an entry of the user.

For example, during the liveness test, the controller 260 may also verify whether there is transmission or saturation in the infrared image and/or there is a reflection point shown in the infrared image as infrared light is reflected by pupils of the user. The controller 260 may verify whether at least one of the transmission and the saturation of the infrared light occurs in the infrared image. When the at least one of the transmission and the saturation is verified to occur, the controller 260 may determine the result of the user authentication to be unsuccessful.

For another example, during the liveness test, the controller 260 may verify whether a box region corresponding a display of an electronic device, a photo image, a sheet of paper, or the like is detected in the infrared image and/or the color image, or a body part such as a finger is detected in the infrared image and/or the color image. When the box region or the body part such as a finger is detected, the controller 260 may determine the result of the user authentication to be unsuccessful without performing the face authentication.

In addition, when the reflection point shown when the infrared light is reflected by the pupils of the user is verified to be present in the infrared image, the controller 260 may perform the face authentication based on the face image store din the card and at least one of the color image and the infrared image. In contrast, when the reflection point is verified not to be present in the infrared image, the controller 260 may determine the result of the user authentication to be unsuccessful. In addition, the controller 260 may detect whether the facial region is present in the infrared image and/or the color image. When the facial region is not detected, the controller 260 may determine the result of the user authentication to be unsuccessful.

According to an example embodiment, the controller 260 may perform the liveness test based on the infrared image. When a result of the liveness test is determined to be successful, the controller 260 may determine a result of the face authentication based on information about the facial region in the color image and/or infrared image and information about the facial region in the face image obtained from the card. The face image stored in the card may be an encoded face image.

When the result of the liveness test is determined to be successful, the controller 260 may extract a first facial feature from the encoded face image obtained through the card reader 150, and extract a second facial feature from at least one of the color image obtained through the color camera 240 and the infrared image obtained through the infrared camera 250. The controller 260 may determine the first facial feature by extracting and analyzing facial feature points from the face image obtained from the card, and determine the second facial feature by extracting and analyzing facial feature points from the color image and/or the infrared image.

The controller 260 may compare the first facial feature and the second facial feature, and determine the result of the face authentication based on a result of comparing the first facial feature and the second facial feature. For example, the controller 260 may calculate a similarity between the first facial feature and the second facial feature. In this example, when the calculated similarity is greater than or equal to a threshold value, the controller 260 may determine the result of the face authentication to be successful. In contrast, when the similarity is less than the threshold value, the controller 260 may determine the result of the face authentication to be unsuccessful.

When the result of the user authentication is determined, the controller 260 may perform a control operation to delete, from the storage 270, the infrared image and the color image obtained during the user authentication and the face image of the card.

The user authentication device 130 may perform the user authentication basically by performing the face authentication on the user. However, unlike other authentication devices, the user authentication device 130 may use a face image stored in a card and a face image obtained through a camera, thereby reducing a false acceptance rate and a false rejection rate and improving security and user convenience. In addition, as user registration is performed in a process of issuing the card, the user authentication device 130 may provide convenience to the user and a manager and enable easy installation and operation in a plug-and-play manner.

The user authentication system may operate in a way that bio-information such as a face image stored in the security card 120 possessed by the user is used once in the user authentication device 130, not in a way that bio-information for face authentication is stored in the user authentication device 130 or another external server. Thus, the user authentication system may be free from the hacking of bio-information, and reduce the cost for managing personal information and the cost for constructing the authentication system.

In addition, in the user authentication system, bio-information stored in the security card 120 is compared to information obtained from a real person who tries to do user authentication in front of the user authentication device 130, and thus stealing and using the security card 120 by a third person may not be possible even when the security card 120 is lost. Thus, the user authentication system may provide a high level of security.

Figure 3:
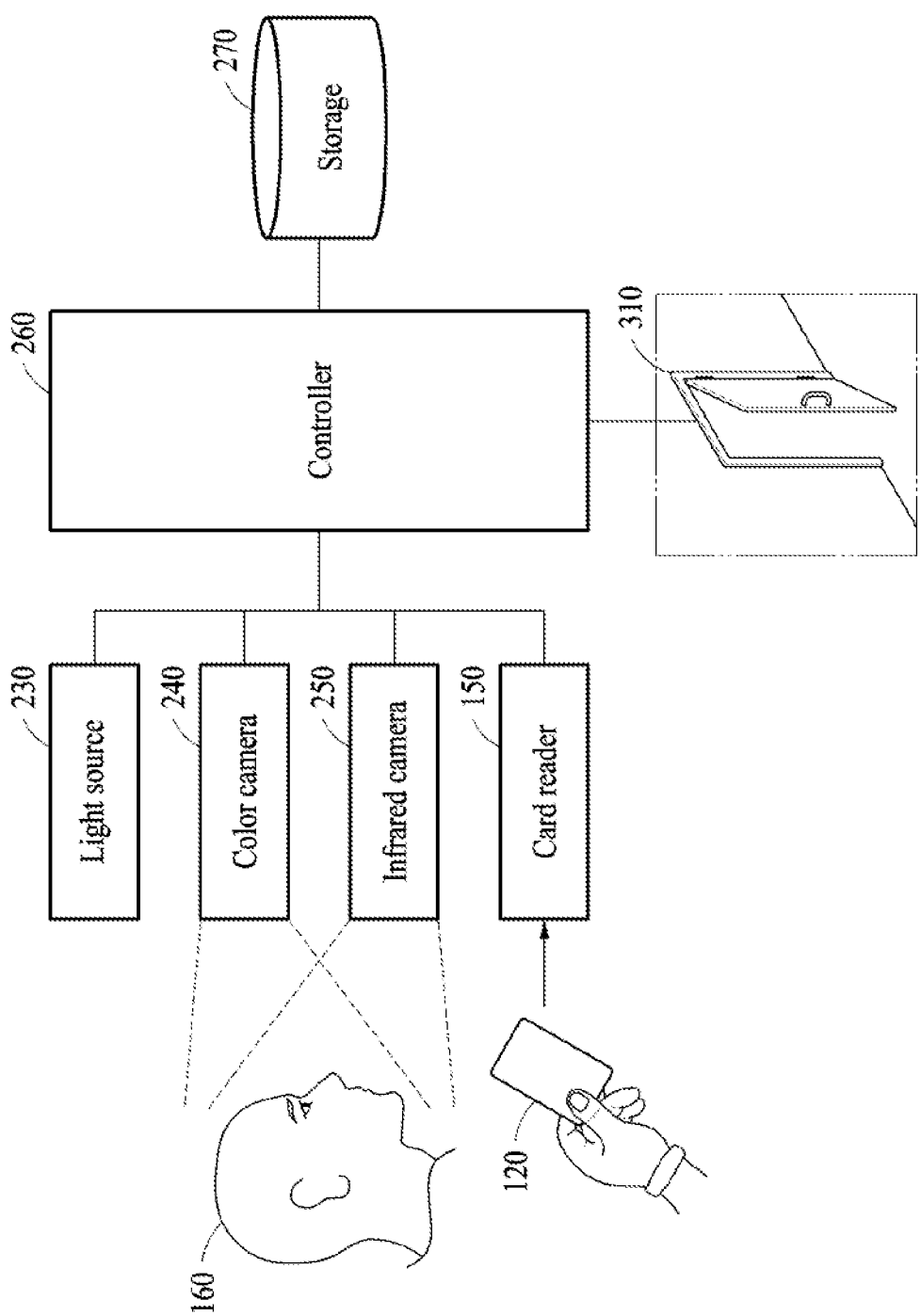
FIG. 3 is a diagram illustrating an example of an operation of a user authentication device according to an example embodiment.

FIG. 3 is a diagram illustrating an example of an operation of a user authentication device according to an example embodiment.

Referring to FIG. 3, a user authentication device may monitor whether a user authentication event occurs when a card reader 150 recognizes an access of a security card 120 to the card reader 150. When the access of the security card 120 is recognized by the card reader 150, the user authentication device may verify whether the security card 120 is an authorized security card based on card information transmitted from the security card 120 through the card reader 150. When the security card 120 is verified to be an authorized security card, the user authentication event may occur, and a face image stored in the security card 120 may be transmitted to the user authentication device through short-range wireless communication. The face image may be decoded by a controller 260 and stored in a storage 270.

The controller 260 may extract a first facial feature corresponding to first bio-information by analyzing the face image obtained from the security card 120. For example, the first facial feature may include facial feature point information. The controller 260 may temporarily store information about the extracted first facial feature in the storage 270.

The controller 260 may activate a light source 230, a color camera 240, and an infrared camera 240 to capture an image of a face 160 of a user possessing the security card 120. The light source 230 may emit infrared light toward the face 160 of the user, and the infrared camera 250 may obtain an infrared image including a facial region of the user by receiving reflected light that returns after the infrared light emitted from the light source 230 is reflected by the face 160 of the user. The color camera 240 may obtain a color image including the facial region by capturing an image of the face 160 of the user.

The controller 260 may perform a liveness test based on the obtained infrared image and/or the obtained color image. The liveness test may be performed to distinguish a genuine human face and a fake face represented by a photo image, a replica, an image, or the like. When the fake face is determined, a result of the liveness test may be determined to be unsuccessful. When the genuine face is determined, the result of the liveness test may be determined to be successful.

According to an example embodiment, the liveness test may include allowing the light source 230 to emit infrared light of a random pattern, verifying whether a transmission phenomenon and/or a saturation phenomenon occurs in the infrared image, and verifying whether the facial region of the user is included in the infrared image or verifying whether a reflection point shown when the infrared light is reflected by pupils of the user is included in the infrared image. These processes may include detecting a pupil region of the user in the infrared image, and verifying whether the reflection point is present in the detected pupil region. When the transmission phenomenon or the saturation phenomenon is verified to occur or when the reflection point is not detected, the result of the liveness test may be determined to be unsuccessful. In addition, the liveness test may include verifying whether a box region corresponding to a display of an electronic device, a photo image, a sheet of paper, or the like is detected in the infrared image and/or the color image, and a body part such as a finger and the like is detected in the infrared image and/or the color image. When the box region is detected in the infrared image and/or the color image or the body part such as a finger is detected in the infrared image and/or the color image, the result of the liveness test may be determined to be unsuccessful.

When the result of the liveness test is determined to be unsuccessful, a subsequent operation may not be performed, and a final result of the user authentication may be determined to be unsuccessful. Conversely, when the result of the liveness test is determined to be successful, face authentication may then be performed.

When the face authentication is performed, the controller 260 may extract a second facial feature corresponding to second bio-information from the color image by analyzing the color image and/or the infrared image. The second facial feature may include facial feature point information extracted from the color image and/or the infrared image. The controller 260 may detect a facial region of the user in the color image and/or the infrared image, and extract facial feature points (e.g., feature points in regions of eyes, a nose, lip edges, eyebrows, etc.) as the second facial feature from the detected facial region. The controller 260 may temporarily store information about the extracted second facial feature in the storage 270.

The controller 260 may compare the first facial feature and the second facial feature and calculate a similarity between the two facial features. When the calculated similarity satisfies a preset condition, for example, when the calculated similarity is greater than or equal to a threshold value, the controller 260 may determine the face authentication to be successful. In contrast, when the calculated similarity does not satisfy the condition, the controller 260 may determine the face authentication to be unsuccessful.

The controller 260 may transmit information about the result of the user authentication or perform an operation corresponding to the result of the user authentication that is successful, based on the result of the user authentication. For example, when the result of the liveness test is determined to be unsuccessful or when the result of the face authentication is determined to be unsuccessful, the user authentication may be finally determined to be unsuccessful, and the controller 260 may perform a control operation of blocking an access to a gate 310. When both the result of the liveness test and the result of the face authentication are determined to be successful, the user authentication may be finally determined to be successful, and the controller 260 may perform a control operation of allowing the access to the gate 310 and opening the gate 310.

When the entire process of the user authentication including the liveness test and/or the face authentication is terminated, the controller 260 may perform a control operation to delete, from the storage 270, sets of data including, for example, information obtained from the security card 120, the infrared image, the color image, the information about the result of the user authentication, and the like. Thus, the user authentication device may not need a separate database that stores therein bio-information of a registered user, and may thus remove a potential risk that the bio-information is hacked.

Figure 4:
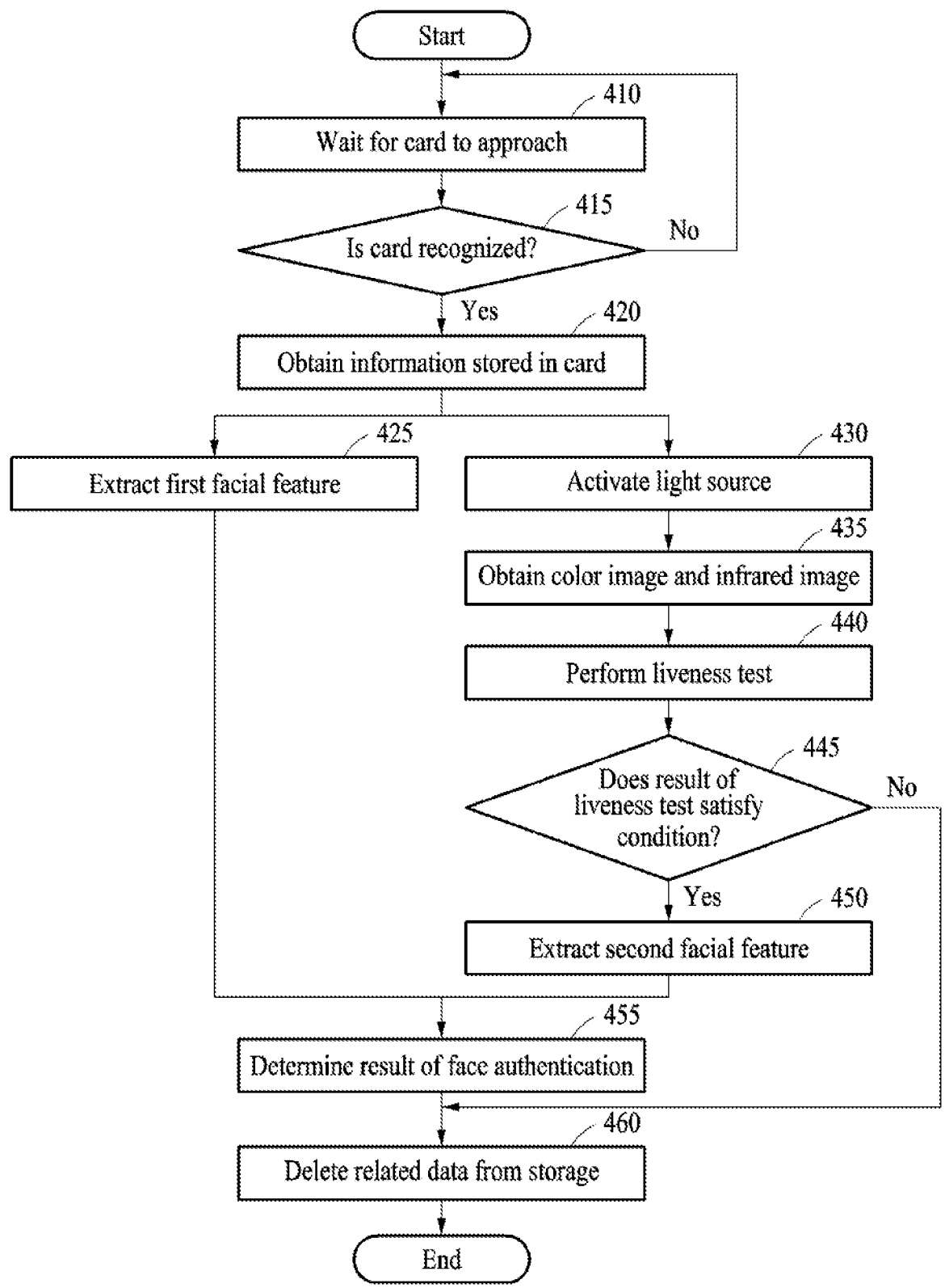
FIG. 4 is a flowchart illustrating an example of a user authentication method according to an example embodiment.

FIG. 4 is a flowchart illustrating an example of a user authentication method. The user authentication method may be performed by a user authentication device described herein.

Referring to FIG. 4, in operation 410, the user authentication device may wait for a card such as a security card to approach a card reader. The card reader of the user authentication device may wait while broadcasting a request signal for obtaining information of the security card.

In operation 415, the user authentication device may monitor whether the card is recognized or not. When the card is not recognized as a result of the monitoring, the user authentication device 410 may return to operation 410 and continue waiting. According to an example embodiment, when a user brings the security card to be close to the card reader of the user authentication device, the card reader that performs short-range wireless communication may verify whether the security card is authorized or not. For example, the user authentication device may verify whether the security card is an authorized card or not by verifying an issuance code or a unique identification sign that is stored in the security card. In this example, when the security card is verified to be an unauthorized card, the user authentication device may return to a waiting state in operation 410.

When the card is recognized as an authorized card, a user authentication event may occur, and the user authentication device may obtain information stored in the card through the card reader in operation 420. For example, the user authentication device may obtain a face image or information about a unique identification sign that is stored in the card through the card reader. The user authentication device may decode the obtained the face image or the obtained information about the unique identification sign and temporarily store the decoded face image or information.

The user authentication event may also occur in a case in which a facial region is detected by an infrared camera or a color camera or in a case in which an object is sensed to approach the user authentication device through a proximity sensor, in addition to the foregoing case in which the card is recognized.

In operation 425, the user authentication device may extract a first facial feature from the information obtained through the card reader. The user authentication device may decode the encoded face image obtained through the card reader, and extract the first facial feature from the decoded face image. For example, the user authentication device may analyze the decoded face image and extract facial feature point information. The user authentication device may temporarily store, in a storage, information about the extracted first facial feature.

In operation 430, the user authentication device may activate a light source. When the light source is activated, the light source may emit infrared light toward a user.

In operation 435, the user authentication device may obtain a color image including a facial region of the user who is an authentication target through a color camera, and obtain an infrared image including the facial region of the user through an infrared camera. The user authentication device may obtain the color image and the infrared image including the facial region of the user in real time, and determine a result of the user authentication based on at least one of the infrared image, the color image, and the face image obtained from the card. To determine the result of the user authentication, the user authentication device may perform a liveness test and face authentication.

In operation 440, the user authentication device may perform the liveness test to determine whether the user is a genuine object or not. In operation 445, the user authentication device may determine whether a result of the liveness test satisfies a preset condition.

For example, the user authentication device may detect whether the facial region of the user is present in the color image and/or the infrared image. When the facial region is not detected in the color image and/or the infrared image, the user authentication device may determine the result of the user authentication to be unsuccessful. The user authentication device may detect the facial region of the user in the color image and/or the infrared image in real time. When the facial region is not detected even after a certain period of time elapses, the user authentication device may determine that the result of the liveness test does not satisfy the condition and finally determine the user authentication to be unsuccessful.

In addition, the user authentication device may verify whether at least one of transmission and saturation of the infrared light occurs in the infrared image. When the at least one of the transmission and the saturation occurs, the user authentication device may determine that the result of the liveness test does not satisfy the condition and finally determine the user authentication to be unsuccessful.

In addition, the user authentication device may verify whether there is a reflection point in the infrared image that is shown when the infrared light is reflected by pupils of the user. When the reflection point is verified not to be present in the infrared image, the user authentication device may determine that the result of the liveness test does not satisfy the condition and finally determine the user authentication to be unsuccessful.

In addition, the user authentication device may verify whether a box region corresponding to a display of an electronic device, a photo image, a sheet of paper, or the like is detected in the infrared image and/or the color image, or a body part such as a finger and the like is detected in the infrared image and/or the color image. When the box region or the body part such as a finger is detected, the user authentication device may determine that the result of the liveness test does not satisfy the condition and finally determine the user authentication to be unsuccessful.

In operation 460, when the result of the liveness test does not satisfy the condition, the user authentication device may terminate the user authentication and delete related information from the storage.

When the result of the liveness test satisfies the condition and the result of the liveness test is thus determined to be successful, the user authentication device may perform the face authentication. For example, when the reflection point of the pupils is verified to be present in the infrared image, the user authentication device may determine that the result of the liveness test satisfies the condition. In this example, the user authentication device may perform the face authentication based on the face to image stored in the card and the color image and/or the infrared image, and determine a result of the face authentication.

In operation 450, when the result of the liveness test is determined to be successful and the face authentication is thus performed, the user authentication device may extract a second facial feature from the color image and/or the infrared image. The user authentication device may analyze the color image and/or the infrared image and analyze a face image in the color image and/or the infrared image to extract facial feature point information. The user authentication device may temporarily store information about the extracted second facial feature in the storage.

In operation 455, the user authentication device may determine the result of the face authentication based on the first facial feature and the second facial feature. The user authentication device may determine a similarity by comparing the first facial feature and the second facial feature, and determine the result of the face authentication based on a result of comparing the first facial feature and the second facial feature. For example, the user authentication device may perform the face authentication by comparing feature points indicated respectively by the first facial feature and the second facial feature and determining whether they correspond to a face of the same user.

When the result of the face authentication is successful, the user authentication device may perform a processing operation corresponding to the user authentication that is successful. When the result of the face authentication is unsuccessful, the user authentication device may prevent or disallow an approach by the user or perform a processing operation corresponding to the user authentication that is unsuccessful.

In operation 460, when the result of the user authentication is determined, the user authentication device may delete the related data from the storage. For example, when the result of the user authentication is determined, the user authentication device may delete, from the storage, the infrared image, the color image, and the face image obtained from the card, which are obtained during the user authentication. Thus, bio-information of the user who attempts at the user authentication may not be left in the user authentication device or another device after the user authentication.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A user authentication device, comprising:
a card reader configured to obtain a face image stored in a card when the card is recognized;
an infrared light source configured to emit infrared light toward a user;
an infrared camera configured to obtain an infrared image comprising a facial region of the user;
a color camera configured to obtain a color image comprising the facial region of the user; and
a controller configured to determine a result of user authentication based on at least one of the infrared image, the color image, and the face image, and generate a control signal based on the result of the user authentication,
wherein the controller is configured to:
perform a liveness test based on the infrared image; and
when a result of the liveness test is determined to be successful, determine a result of face authentication based on information about the facial region in at least one of the color image and the infrared image and on the face image obtained from the card,
wherein the card is a security card comprising an encoded face image,
wherein the controller is configured to:
extract a first facial feature corresponding to first bio-information from the encoded face image obtained through the card reader without going through the liveness test;
when the result of the liveness test is determined to be successful, extract a second facial feature corresponding to second bio-information from at least one of the color image and the infrared image;
determine the result of the face authentication based on a result of comparing the first facial feature and the second facial feature, the first facial feature and the second facial feature being independently extracted,
wherein the controller is configured to terminate the user authentication and delete related information from a storage when the result of the liveness test is not successful,
wherein the controller is configured to perform the face authentication by comparing feature points indicated respectively by the first facial feature and the second facial feature and determining whether they correspond to a face of the same user,
wherein the user authentication device temporarily stores information about the extracted first facial feature and the extracted second facial feature, and
wherein the user authentication device is not configured to require a separate database that stores bio-information of the user.

2. The user authentication device of claim 1, wherein the controller is configured to:
when the result of the user authentication is determined, perform a control operation to delete, from the storage, the obtained infrared image, the obtained color image, and the obtained face image.

3. The user authentication device of claim 1, wherein the controller is configured to:
verify whether a reflection point shown when the infrared light is reflected by a pupil of the user is present in the infrared image; and
when the reflection point is verified not to be present in the infrared image, determine the result of the user authentication to be unsuccessful.

4. The user authentication device of claim 3, wherein the controller is configured to
when the reflection point of the pupil is verified to be present in the infrared image, perform the face authentication based on at least one of the color image and the infrared image and on the face image stored in the card.

5. The user authentication device of claim 1, wherein the controller is configured to:
   detect whether the facial region of the user is present in the infrared image; and
   when the facial region is not detected in the infrared image, determine the result of the user authentication to be unsuccessful.

6. The user authentication device of claim 1, wherein the controller is configured to:
   verify whether at least one of transmission and saturation of the infrared light occurs in the infrared image; and
   when the at least one of the transmission and the saturation is verified to occur, determine the result of the user authentication to be unsuccessful.

7. A user authentication method, comprising:
   obtaining a face image stored in a card through a card reader;
   emitting infrared light toward a user;
   obtaining an infrared image comprising a facial region of the user and obtaining a color image comprising the facial region of the user; and
   determining a result of user authentication based on at least one of the infrared image, the color image, and the face image,
   wherein the determining of the result of the user authentication comprises:
      performing a liveness test based on the infrared image; and
      when a result of the liveness test is determined to be successful, determining a result of face authentication based on information about the facial region in at least one of the color image and the infrared image and on the face image obtained from the card,
   wherein the card is a security card comprising an encoded face image,
   wherein the determining of the result of the user authentication further comprises:
      extracting a first facial feature corresponding to first bio-information from the encoded face image obtained through the card reader without going through the liveness test,
      when the result of the liveness test is determined to be successful, extracting a second facial feature corresponding to second bio-information from at least one of the color image and the infrared image,
      determining the result of the face authentication based on a result of comparing the first facial feature and the second facial feature, the first facial feature and the second facial feature being independently extracted,
      terminating the user authentication and deleting related information from a storage when the result of the liveness test is not successful,
      performing the face authentication by comparing feature points indicated respectively by the first facial feature and the second facial feature and determining whether they correspond to a face of the same user, and
      temporarily storing information about the extracted first facial feature and the extracted second facial feature, and
   wherein the user authentication method does not require a separate database that stores bio-information of the user.

8. The user authentication method of claim 7, further comprising:
   when the result of the user authentication is determined, deleting the obtained infrared image, the obtained color image, and the obtained face image from the storage.

9. The user authentication method of claim 7, wherein the determining of the result of the user authentication comprises:
   verifying whether a reflection point shown when the infrared light is reflected by a pupil of the user is present in the infrared image; and
   when the reflection point is verified not to be present in the infrared image, determining the result of the user authentication to be unsuccessful.

10. The user authentication method of claim 9, wherein the determining of the result of the user authentication comprises:
    when the reflection point of the pupil is verified to be present in the infrared image, performing the face authentication based on the face image stored in the card and at least one of the color image and the infrared image.

11. The user authentication method of claim 7, wherein the determining of the result of the user authentication comprises:
    detecting whether the facial region of the user is present in the infrared image; and
    when the facial region is not detected in the infrared image, determining the result of the user authentication to be unsuccessful.

12. The user authentication method of claim 7, wherein the determining of the result of the user authentication comprises:
    verifying whether at least one of transmission and saturation of the infrared light occurs in the infrared image; and
    when the at least one of the transmission and the saturation is verified to occur, determining the result of the user authentication to be unsuccessful.

13. A non-transitory computer-readable storage medium storing a program that performs the user authentication method of claim 7.

* * * * *